Sept. 11, 1951     M. W. SMITH ET AL     2,567,450
FINES SEPARATION
Filed Feb. 13, 1948     2 Sheets-Sheet 1
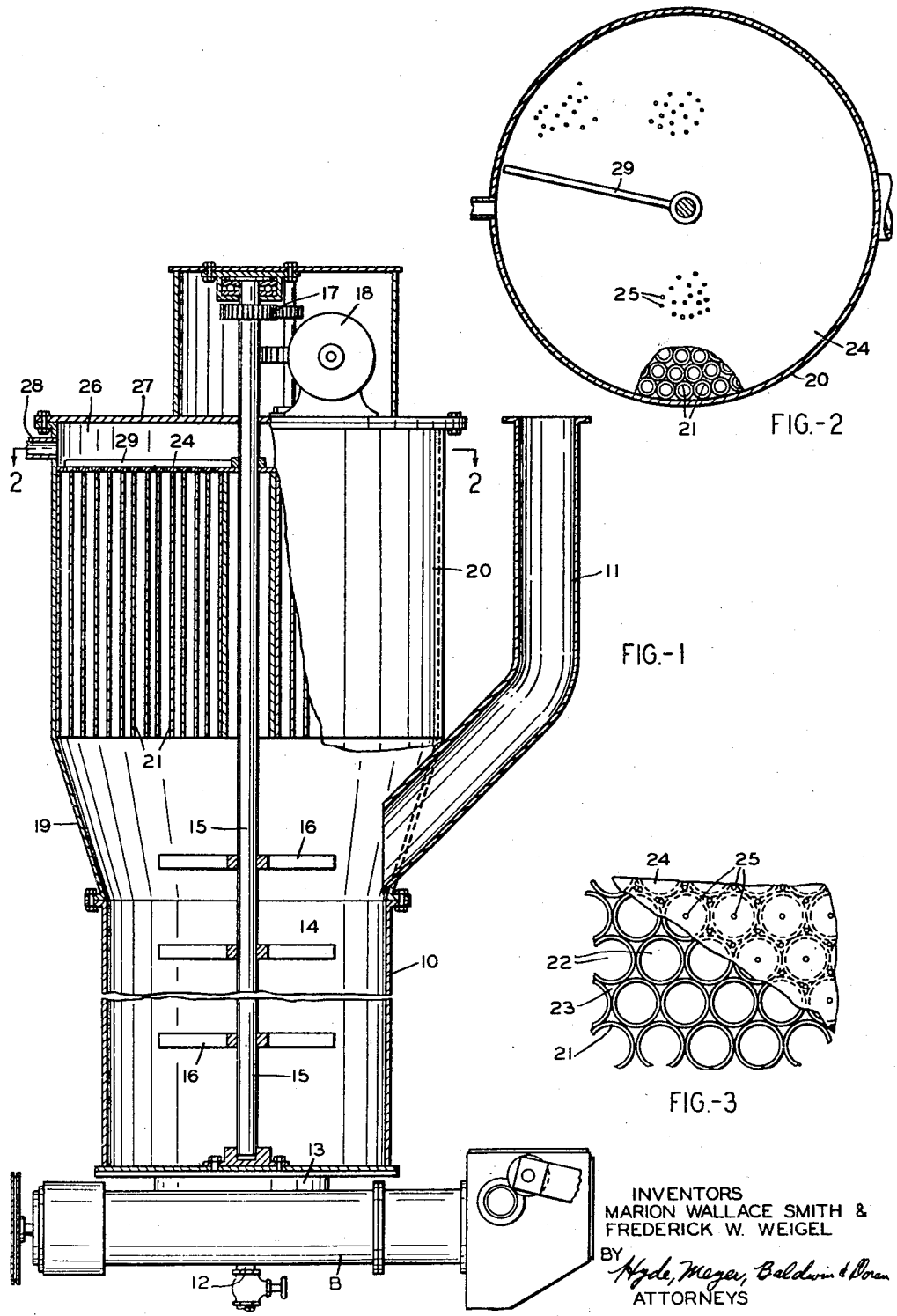

Patented Sept. 11, 1951

2,567,450

UNITED STATES PATENT OFFICE 2,567,450

FINES SEPARATION

Marion Wallace Smith, Bay Village, and Frederick W. Weigel, Fairview Village, Ohio, assignors to The V. D. Anderson Company, Cleveland, Ohio, a corporation of Ohio Application February 13, 1948, Serial No. 8,086

3 Claims. (Cl. 210—51)

This invention relates to the separation of finely divided solid material from a suspension thereof in a fluid.

The invention is an improvement over that described and claimed in a patent for Method and Apparatus for Separating Finely Divided Solid Material From a Fluid Suspension Thereof, No. 2,441,200, granted May 11, 1948, to Louis F. Langhurst, to which reference may be had if desirable or necessary.

According to the invention of said prior application, prepared seed, such as soy beans in flaked form, is passed through an extraction chamber in counterflow relation with a stream of solvent liquid, such as hexane. The resulting miscella, consisting of a solution of the oil in the solvent, carrying some fine solid material in suspension is passed through a fines separator formed to provide a separating chamber including a plurality of parallel channels of small cross sectional area. Means is provided to cause flow of the liquid through only one or a few of said channels at any one time, the several channels being made effective in this way serially or in order. Thus the miscella in each channel is in motion for only a short active period, during each cycle, being quiescent and permitting settling of the solid material within it during a considerably longer inactive period of the cycle.

With such equipment, however, it has at times been difficult to entirely seal the channels against flow, turbulence or liquid motion during their inactive periods. Some flow has been unavoidable even with close tolerances between relatively movable surfaces where flow should be prevented, with consequent disturbance of the stream and inability to clear it of fine solid particles.

The present invention aims to provide method and apparatus which overcomes the foregoing objections by handling the miscella in a different way, causing it to move or travel in such manner that separation of the fines is unavoidable, thus insuring a clear liquid product of high quality.

Another object is to provide improved method and apparatus for separating solid from a stream or mass of liquid material by causing the mass to flow simultaneously through a separating chamber including a large number of parallel vertically disposed channels of relatively small cross sectional area, but in each thereof at a rate slower than the rate of gravitational separating movement of the finest solid particles, thus insuring their return to the original mass where they collect and may be removed from the system.

A further object is to provide an improved fines separator including a separating chamber providing a plurality of parallel vertically disposed channels of relatively small cross sectional area, each terminating in a relatively minute outlet orifice, considerably smaller, in cross sectional area, than the channel itself, thereby retarding fluid flow through the channel to a rate which permits separation by variations in density of the fine solid particles and consequent clarification of the carrying fluid.

Further advantages of the invention in part are obvious and in part will appear more in detail hereinafter.

In the drawings, Fig. 1 represents a sectional elevation of one form of apparatus suitable for use in carrying out the invention;

Fig. 2 is a sectional plan view on the line 2—2, Fig. 1, partly broken away to expose underlying parts;

Fig. 3 is a similar detail view, on a larger scale; and

Figure 4:
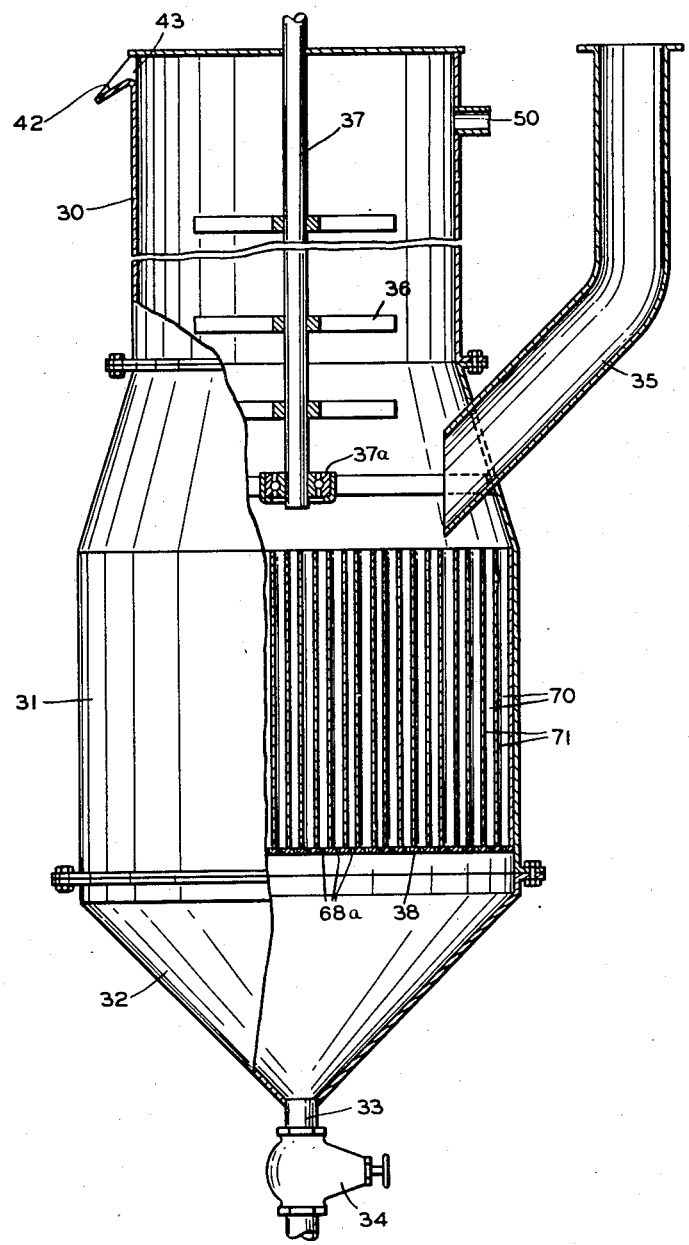
Fig. 4 is a view similar to Fig. 1 and illustrating a modification.

While capable of use for separating any desired solid from any fluid, either gas or liquid, the invention has more particular application for the separation of solid material from a suitable carrying liquid, such as a volatile solvent employed for the extraction, by solution, of some value from the solid. The liquid may be either lighter or heavier than the solid, but for purposes of illustration, and in no sense of limitation, the invention will be first described in one embodiment suitable for use in the separation of a prepared oil-bearing seed, such as soy beans, from a mixture of seed oil and a solvent lighter than the seed, such as hexane, which mixture is generally referred to as miscella.

The apparatus shown in Figs. 1 to 3 of the drawings consists of a tall cylindrical extracting tower 10, which may be of any height suitable for the purpose and to which is connected a supply pipe, chute or conduit 11 through which the solid material to be treated may be introduced to an upper level in the tower from a suitable source, such as a feeder, hopper or bin (not shown). The bottom of the tower is provided with suitable means, such as a valved supply pipe 12, for the solvent liquid, and with suitable means for continuously discharging the solid material, such as a screw or worm type outlet valve mechanism, conventionally indicated at B. The particular form of this mechanism forms no part of the present invention, and therefore requires no detailed description, but it may be, for example, of the form shown and described in a prior application for Outlet Valve Mechanism for Solvent Extraction Plants, Serial No. 706,221, filed October 28, 1946, now Patent No. 2,558,408, June 26, 1951, by Carl W. Zies, to which reference may be had if desirable or necessary.

Within the tower chamber 14 is mounted an agitator shaft 15 having agitating arms 16, said shaft being rotatable slowly, through suitable speed reducing gearing marked generally 17, by a motor 18.

The upper portion of the tower is provided with a flared section 19 extending above the uppermost arm 16 and the supply opening from conduit 11, and above which is a third cylindrical section 20 which encloses the fines separating instrumentalities. This separator section is thus of larger diameter and cross sectional area than those at the small end of the flared section enclosing the supply portion of the separating chamber. In a typical instance the cylindrical portion of the separator may be 72 inches in diameter and five or six feet high.

Within the separator section I provide means for subdividing the chamber within it into a large number of parallel vertically extending channels, each of relatively small cross sectional area as compared with that of the separating chamber as a whole, and through all of which channels the liquid flows continually when the system is in operation. This may be accomplished in various ways, such as by intersecting thin metal walls or plates interlocked like those in an egg crate, or by radial and circumferentially extending plates, as in the aforesaid Langhurst patent. The drawings, however, show a series of pipe members 21, bundled together in parallel arrangement, and secured together in close neighboring relation, and to the outer enclosing wall, in any suitable manner, as by welding. For example these may be two-inch pipes five feet or so in length cut off square at both ends. Six or seven hundred or more such pipes may be used in this typical instance, thus providing not only six or seven hundred cylindrical channels 22 through the pipes themselves, but also a approximately equal number of generally triangular or square intervening channels 23 in the spaces between pipes, according to how they are relatively disposed in the bundle.

The lower ends of all pipes are wide open, providing full communication with the liquid supply portion of the separating chamber in section 19. Their upper ends are all welded to or otherwise in sealed relation to a horizontal cross plate or wall 24 which is provided with a large number of small holes or orifices 25, one for each pipe channel 22, and one for each intervening channel 23. These orifices, for example, may be of the order of one-eighth or one-quarter of an inch in diameter, much less than the cross sectional area of the pipe channels or spaces intervening between them.

The several orifices all open into the liquid discharge portion 26 of the separating chamber, which is closed by a cover 27 and is provided with a discharge pipe 28 for clarified liquid. Pipe 28 establishes the liquid level through the extracting and fines separating unit when it is full and in operation, as will be apparent.

In the operation of the apparatus described, the flakes and fine solid material fed into the extractor through the chute 11 are distributed evenly over the full area of the extractor column by the slowly rotating sweeps, spreaders or agitators 16. The miscella, resulting from the mixture of solvent and extracted seed oil, is at maximum concentration of oil adjacent the lower end of the chute in the supply chamber within the tapered portion of the casing, thus offering sufficient buoyancy to the prepared seed to cause dispersion of the flakes and fine material through the miscella. This chamber therefore serves or functions as a supply reservoir containing a large mass or body of miscella ready for flow and distribution to the several small separating channels or passageways and to which solid material separated in such channels is returned for collection and withdrawal.

Rates of flow of materials and sizes of chambers, channels and openings, of course, are all chosen or designed in proper proportions with due regard for each other.

The rates of ingress and egress of solid material are the same, so that after the system has been in operation long enough to build up a store of solid material in the extractor to about the level of the bottom of the flared portion of the casing, that level of solid material thereafter is maintained, with but little variation from time to time.

The solvent liquid, of course, is supplied in quantity and at a rate suitable to secure maximum oil extraction with minimum quantity of solvent. In the end that reduces itself to so many cubic feet per minute for a given kind and condition of seed flakes.

Knowing that, from experience, the diameter of the separator section and the number, sizes and lengths of the pipes or other channel forming members are chosen in appropriate proportions. Moreover the openings or orifices 25 are made of such size that from 75% to 90% of them must be in operation to provide sufficient area to carry away that quantity of liquid which enters through supply pipe 12, plus the oil taken up thereby. That permits reasonable fluctuation in rates of supply and provides some excess area, should some orifices become clogged. It also prevents any possibility of permitting the miscella to follow a path short circuited, as it were, through only one or a few pipes or channels.

The result is that in each pipe channel, and in each channel between pipes, the orifice abruptly reduces the cross-sectional area and thus applies a retarding influence to the flow of liquid through the length of the channel to a rate less than the rate of gravitational separating movement of the fine particles, whether it be up or down, in this particular instance, down. Thus the fine solid particles which normally might be carried out with the liquid through the upper end of each channel now find opportunity to travel back through the length of the channel into the supply chamber, where they mingle and move downwardly with the larger solid particles to the bottom outlet 13. Consequently the liquid which is delivered to discharge chamber 26 through orifices 25 is unusually clear and free from solids.

Removal or elevation of cover plate 27 enables the orifices readily to be opened or cleaned when necessary, although this usually is desirable only at infrequent intervals, if at all. If desired, a sweep arm 29, attached to shaft 15, may be provided to wipe over and clean the several orifices 25, although this is not essential.

Fig. 4 of the drawings illustrates another arrangement for separating solid matter from a heavier liquid by flotation or upward movement therein.

This arrangement is much like that shown in Fig. 1, but turned upside-down as it were. The device shown includes a tall cylindrical column 30 provided at its lower end with a fines separating unit, marked generally 31, below which is a tapering bottom portion 32 providing a discharge space and leading to an outlet 33 for the clarified liquid, controlled by valve 34. The material to be treated, consisting of coarse and fine fragments of solid material, either alone or mixed with a liquid which is heavier than the solid, so that the solid will float upon or rise within it, enters by way of a supply pipe or chute 35 above the separating unit. In the upper cylindrical portion of the tower the solid matter rises by flotation, with agitation produced by agitating arms 36 on a central shaft 37. This shaft extends down to, but not through, the fines separating unit, which is provided with a bearing 37a for supporting the shaft. Within the separating chamber is mounted a series of pipes or other devices 71, similar to that before described, these pipes being bundled and welded together in parallel relation, and also welded to the external enclosing wall, and arranged to provide a series of channels 70 within and between the pipes, these channels being open at their upper ends to the supply reservoir into which the solid material is admitted. The lower ends of the channels within and between the pipes are partially closed by a cross plate 38, welded and thereby sealed to the ends of the pipes, this plate being provided with a series of small holes or orifices 68a, one for each pipe and one for each space between the pipes. The arrangement provides a relatively large number of parallel channels, each of cross sectional area very considerably smaller than that of the separating chamber as a whole, each channel being provided with means at its lower end for retarding flow of the liquid to the discharge chamber.

While the solvent liquid may be introduced through chute 35 with the solid material, the system may be provided at or near the upper end of the column 30 with a separate supply pipe 50, through which the solvent liquid may be introduced in sufficient quantity not only to accomplish efficient extraction of the dissolved material, if that is occurring, and to supply what clarified liquid is withdrawn at the outlet, but also to supply some excess which overflows at the top of the column through the outlet 43 to the spout 42, to withdraw and carry away the solid material which rises but floats to the top of a column. Thus, where extraction of material by a solvent from the solid material initially supplied is a factor in the process, the solid and liquid move in countercurrent relation through the extracting column, as in the form before described.

In this arrangement the solid material is delivered to the supply chamber through the chute 35. Some liquid may accompany it, and some or all of the liquid may enter through the pipe 50. In any event, the liquid travels downwardly, through the separating chamber to the outlet, where the clarified liquid is withdrawn through the pipe 33. The solid material rises by flotation and is carried out through the outlet 43. The fine solid particles which otherwise might travel downwardly with and contaminate the clarified liquid now are compelled to travel upwardly, if at all, into and through the many small channels within and around the pipes 41. In each of said channels the rate of downward liquid flow is retarded to a rate of upward motion of the solid particles by flotation, so that even in said channels the solid particles actually rise and ultimately join those in the supply chamber for withdrawal with the other solid material. Hence, the liquid which is admitted from the lower ends of the channels to the discharge chamber at the bottom of the device is efficiently clarified and quite free from solids.

In both forms the fines separating elements include no moving parts and thus require no ground fits and involve no sealed joints, either at the pipe ends or around the periphery of the column, other than those initially formed by welding or otherwise securing the parts together.

Other advantages of the invention will be apparent to those skilled in the art.

What we claim is:

1. Apparatus for separating fine solid particles from a heavier liquid in which they are suspended, comprising a separating chamber provided with means subdividing it into a relatively large number of upright parallel channels each of cross sectional area which is small in comparison with that of the chamber as a whole, said channels extending from a supply reservoir at the upper end of the chamber to a discharge space at the lower end thereof, means for supplying solid carrying liquid to the supply reservoir, means for withdrawing clarified liquid from the discharge space and thus causing flow in parallel along all channels, each channel having a cross wall near the lower end thereof, said cross wall having a restricted orifice therein whereby said channel communicates with the discharge space by way of said restricted orifice which abruptly changes the rate of liquid flow and retards flow through the length of the channel to a rate of movement less than that of upward flotation movement of the solid particles in the liquid, whereby solid particles in the channels travel upwardly for collection in the supply reservoir, and means for removing the collected solids from the supply reservoir.

2. Apparatus for separating fine solid particles from a fluid in which they are suspended comprising a vertically disposed separating chamber of elongated character provided with means subdividing it into a relatively large number of elongated channels each of cross sectional area which is small in comparison with that of the chamber as a whole, said elongated channels being all parallel to each other and to the length of said chamber, and occupying the complete cross sectional area of the chamber, a supply reservoir coaxially disposed with respect to said chamber and beyond one end thereof, said channels extending from a supply end of said chamber in communication with said reservoir to a discharge space at the other end of said chamber remote from said supply end, means for supplying solid-carrying fluid to said supply reservoir, means for withdrawing clarified fluid from said discharge space, whereby to cause flow in parallel along all channels, fixed means disposed adjacent the discharge ends of said channels for retarding fluid flow along the length of each of said channels at a rate of movement less than that of the motion of separation by variation in density of the solid particles from the fluid, whereby solid particles in the channels travel oppositely to the direction of fluid flow for collection in the supply reservoir, and means for removing the collected solids from the supply reservoir.

3. Apparatus for separating fine solid particles from a fluid in which they are suspended comprising a vertically disposed separating chamber of elongated character provided with means subdividing it into a relatively large number of elongated channels each of cross sectional area which is small in comparison with that of the chamber as a whole, said elongated channels consisting of vertically disposed tubes all parallel to each other and to the length of said chamber, and occupying the complete cross sectional area of the chamber, a supply reservoir coaxially disposed with respect to said chamber, and beyond one end thereof, said channels extending from a supply end of said chamber, in communication with said reservoir to a discharge space at the other end of said chamber remote from the supply end, means for supplying solid-carrying fluid to said supply reservoir, means for withdrawing clarified fluid from said discharge space, whereby to cause flow in parallel along all channels, said chamber having a cross wall extending across the discharge end thereof, said cross wall having restricted orifices therein, one in communication with each said channel whereby each said channel communicates with the discharge space by way of its respective restricted orifice, which abruptly changes the rate of liquid flow and retards flow through the length of the channel to a rate of movement less than that of movement of the solid particles in the liquid, whereby solid particles in the channels settle by gravity away from said cross wall, and means for removing the collected solids from the supply reservoir.

MARION WALLACE SMITH.
FREDERICK W. WEIGEL.

REFERENCES CITED

The following references are of record in the file of this patent:

UNITED STATES PATENTS

| Number | Name | Date |
| --- | --- | --- |
| 624,963 | Nye | May 16, 1899 |
| 1,176,774 | Morris | Mar. 28, 1916 |
| 1,526,197 | Ahlqvist | Feb. 10, 1925 |
| 1,645,093 | Comyn | Oct. 11, 1927 |
| 1,709,676 | Martyn | Apr. 16, 1929 |
| 1,733,324 | Wetherbee | Oct. 29, 1929 |
| 2,351,053 | Klett | June 13, 1944 |
| 2,373,154 | Welp | Apr. 10, 1945 |
| 2,428,756 | Lind | Oct. 7, 1947 |
| 2,441,200 | Langhurst | May 11, 1948 |
| 2,468,069 | Hunter | Apr. 26, 1949 |
| 2,468,597 | Green | Apr. 26, 1949 |